US008345733B2

(12) United States Patent
Ghosh (10) Patent No.: US 8,345,733 B2
(45) Date of Patent: Jan. 1, 2013

(54) METHOD AND APPARATUS FOR EQUALIZING SIGNALS

(75) Inventor: Arunabha Ghosh, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1395 days.

(21) Appl. No.: 11/225,635

(22) Filed: Sep. 13, 2005

(65) Prior Publication Data

US 2007/0058735 A1    Mar. 15, 2007

(51) Int. Cl.
H04B 1/38     (2006.01)
H04L 5/16     (2006.01)

(52) U.S. Cl. ........ 375/220; 375/221; 375/229; 375/231; 375/340; 375/347

(58) Field of Classification Search ............ 375/219, 375/233, 231, 232, 229, 346; 370/210
See application file for complete search history.

(56) References Cited

U.S. PATENT DOCUMENTS

| | | | | |
|---|---|---|---|---|
| 6,327,314 | B1* | 12/2001 | Cimini et al. | 375/340 |
| 6,888,899 | B2* | 5/2005 | Raleigh et al. | 375/299 |
| 7,099,299 | B2* | 8/2006 | Liang et al. | 370/342 |
| 7,218,693 | B2* | 5/2007 | Troulis | 375/346 |
| 7,359,466 | B2* | 4/2008 | Huang et al. | 375/349 |
| 7,539,207 | B2* | 5/2009 | Frederiksen et al. | 370/465 |
| 7,551,664 | B2* | 6/2009 | Zhang et al. | 375/147 |
| 7,873,021 | B2* | 1/2011 | Petre et al. | 370/342 |
| 2001/0047424 | A1* | 11/2001 | Alastalo et al. | 709/236 |
| 2002/0024994 | A1 | 2/2002 | Piirainen et al. | |
| 2004/0176051 | A1 | 9/2004 | Papadimitriou et al. | |
| 2005/0041574 | A1* | 2/2005 | Wu et al. | 370/208 |
| 2005/0141657 | A1* | 6/2005 | Maltsev et al. | 375/346 |

OTHER PUBLICATIONS

John G. Proakis, "Adaptive Equalization for TDMA Digital Mobile Radio"; IEEE Trans. on Veh. Tech., vol. 40, No. 2, May 1991, pp. 333-341.
Jan-Jaap Van De Beek et al., "On Channel Estimation in OFDM Systems"; Proc. IEEE VTC '95, vol. 2, Jul. 1995, pp. 815-819.
Kari Hooli, et al., "Multiple Access Interference Suppression With Linear Chip Equalizers in WCDMA Downlink Receivers"; Proc. IEEE Int. Globecomm '99, Dec. 1999, pp. 467-471.
Kari Hooli, et al., "Performance Evaluation of Adaptive Chip-Level Channel Equalizers in WCDMA Downlink"; Proc. IEEE Int. Conf. Comm. ICC'01, 2001, pp. 1974-1979.
Markku J. Heikkila, et al., "Space-Time Equalization Using Conjugate-Gradient Algorithm in WCDMA Downlink"; Proc. of IEEE PIMRC'02, Sep. 2002, pp. 673-677.

(Continued)

*Primary Examiner* — David Ometz
*Assistant Examiner* — Qutbuddin Ghulamali
(74) *Attorney, Agent, or Firm* — Guntin & Gust, PLC; Ed Guntin (57) ABSTRACT

A system and apparatus are disclosed for a method and apparatus for equalizing signals. An apparatus that incorporates teachings of the present disclosure may include, for example, an equalizer (100) having a channel estimation calculator (102) for calculating a time domain channel estimation from a baseband signal, an FFT processor (104) for translating the time domain channel estimation to a frequency domain channel estimation, a tap weight calculator (106) for calculating a frequency domain tap weight according to the frequency domain channel estimation, an inverse FFT processor (108) for translating the frequency domain tap weight calculation to a time domain tap weight calculation, and a filter (110) for equalizing the baseband signal according to the time domain tap weight calculation.

19 Claims, 5 Drawing Sheets

OTHER PUBLICATIONS

Hafez Hadinejad-Mahram, et al., "Performance Evaluation of Advanced Receivers for WCDMA Downlink Detection"; 0-7803-7442-8/02, 2002 IEEE, pp. 367-371.

David Falconer, et al., "Frequency Domain Equalization for Single-Carrier Broadband Wireless Systems"; IEEE Comm. Mag. vol. 4, No. 4, Apr. 2002, pp. 58-66.

3RD Generation Partnership Project, "Multiplexing and Channel Coding (FDD)"; TS 25.212 V5.7.0, Dec. 2003, pp. 1-76.

3RD Generation Partnership Project, "Spreading and Modulation (FDD)", TS 25.213 V5.5.0, Dec. 2003, pp. 1-28.

3RD Generation Partnership Project, "High Speed Downlink Packet Access (HSDPA); Overall Description Stage 2", TX 25.308 V6.3.0, Dec. 2004, pp. 1-28.

3rd Generation Partnership Project, "User Equipment (UE) Radio Transmission and Reception (FDD)", TS 25.101 V6.8.0, Jun. 2005, pp. 1-118.

* cited by examiner

| Prior Art LMMSE | | |
|---|---|---|
| | Number of Additions | $E^2(E+L) + E(E+L)$ |
| | Number of Multiplication | $E^2(E+L) + E(E+L-1)$ |
| | Number of Additions for Matirx Inversion | $E^3/2 - 3E/2 + 1$ |
| | Number of Multiplications for Matirx Inversion | $E^3/2 + E^2 - 5E/2 + 2$ |
| MMSE of Present Disclosure | | |
| | Other (FFT) | $2N \ln_2(N)$ |
| | Number of Additions | $N(E+1)$ |
| | Number of Multiplications | $N(E+2)$ |
| | Number of Divisions | $N$ |

FIG. 8

| | Prior Art LMMSE | MMSE of Present Disclosure |
|---|---|---|
| Ped A | 3468 | 415 |
| Ped B | 62283 | 2440 |

FIG. 9 900 ed signals from said users. The controller 208 performs
METHOD AND APPARATUS FOR EQUALIZING SIGNALS

FIELD OF THE DISCLOSURE

The present disclosure relates generally to equalizers utilized in communication systems, and more specifically to a method and apparatus for equalizing signals.

BACKGROUND

In recent years high speed communications in excess of 10 Mbps has rapidly spread to cellular systems, broadband systems for residential environments, WiFi hotspots such as coffee shops, and so on. Some of these higher communication speeds based on single carriers systems such as CDMA, GSM, TDMA, WCDMA, etc., require a receiver architecture more advanced than a typical Rake receiver in order to function in environments with a large delay spread.

One such commonly accepted receiver architecture that is more resilient to multipath distortion is based on a Linear Minimum Mean Squared Error (LMMSE) equalizer. One of the main issues with LMMSE equalization, however, is the need for inverting relatively large matrices, which manifests itself in the form of computational and cost overhead.

DETAILED DESCRIPTION OF THE DRAWINGS

Figure 1:
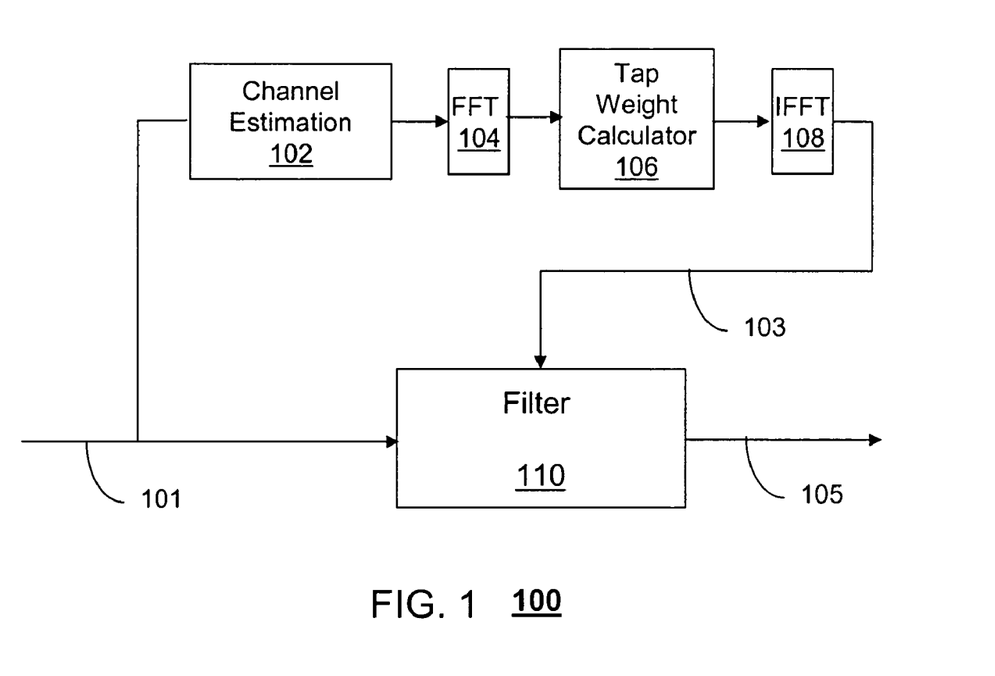
FIG. 1 is a block diagram of an equalizer incorporating teachings of the present disclosure.
Figure 2:
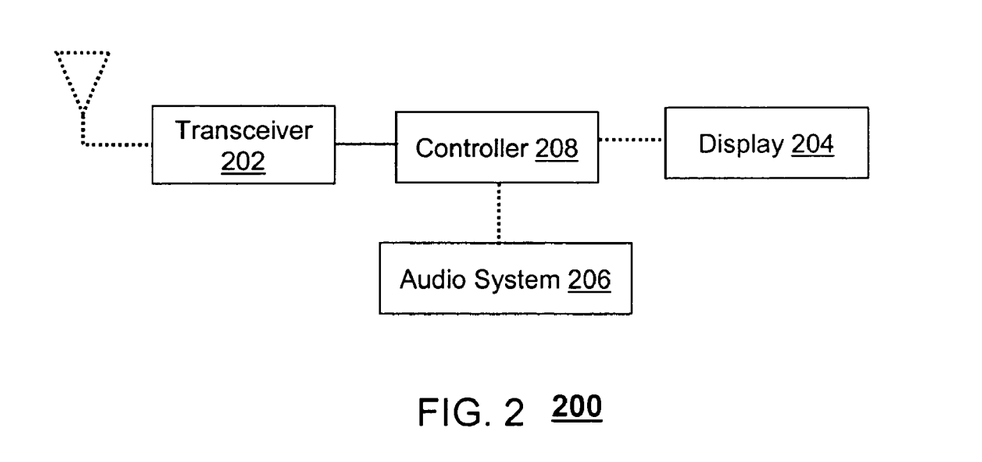
FIG. 2 is a block diagram of communication device incorporating teachings of the present disclosure.

FIG. 1 is a block diagram of an equalizer 100 incorporating teachings of the present disclosure. The equalizer 100 comprises a channel estimation calculator 102, a Fast Fourier Transform (FFT) processor 104, a tap weight calculator 106, an inverse FFT (IFFT) 108, and a filter 110. The equalizer 100 can be incorporated into a communication device 200 such as illustrated in FIG. 2 according to the teachings of the present disclosure.

The communication device 200 can comprise a transceiver 202, a display 204, and audio system 206, and a controller 208. The transceiver 202 can be used as a wireless or wireline communication element for processing baseband signals. In wireless applications, the transceiver 202 can be used for down-converting a carrier signal to a baseband signal in a downlink operation, and up-convert a baseband signal to the carrier signal for an uplink operation for communications such as with a remote device.

The display 204 can utilize technology such as an LCD (Liquid Crystal Display) to convey images to an end user of the communication device 200. The audio system 206 utilizes common technology for intercepting and/or conveying audible signals from said users. The controller 208 performs signal processing on the baseband signal and manages control of the communication device 2000 according to the teachings of the present disclosure. The controller 208 can comprise a microprocessor, a digital signal processor (DSP), an ASIC (Application Specific Integrated Circuit), or combinations thereof, with one or more corresponding memories for storage and data manipulations.

Figure 3:
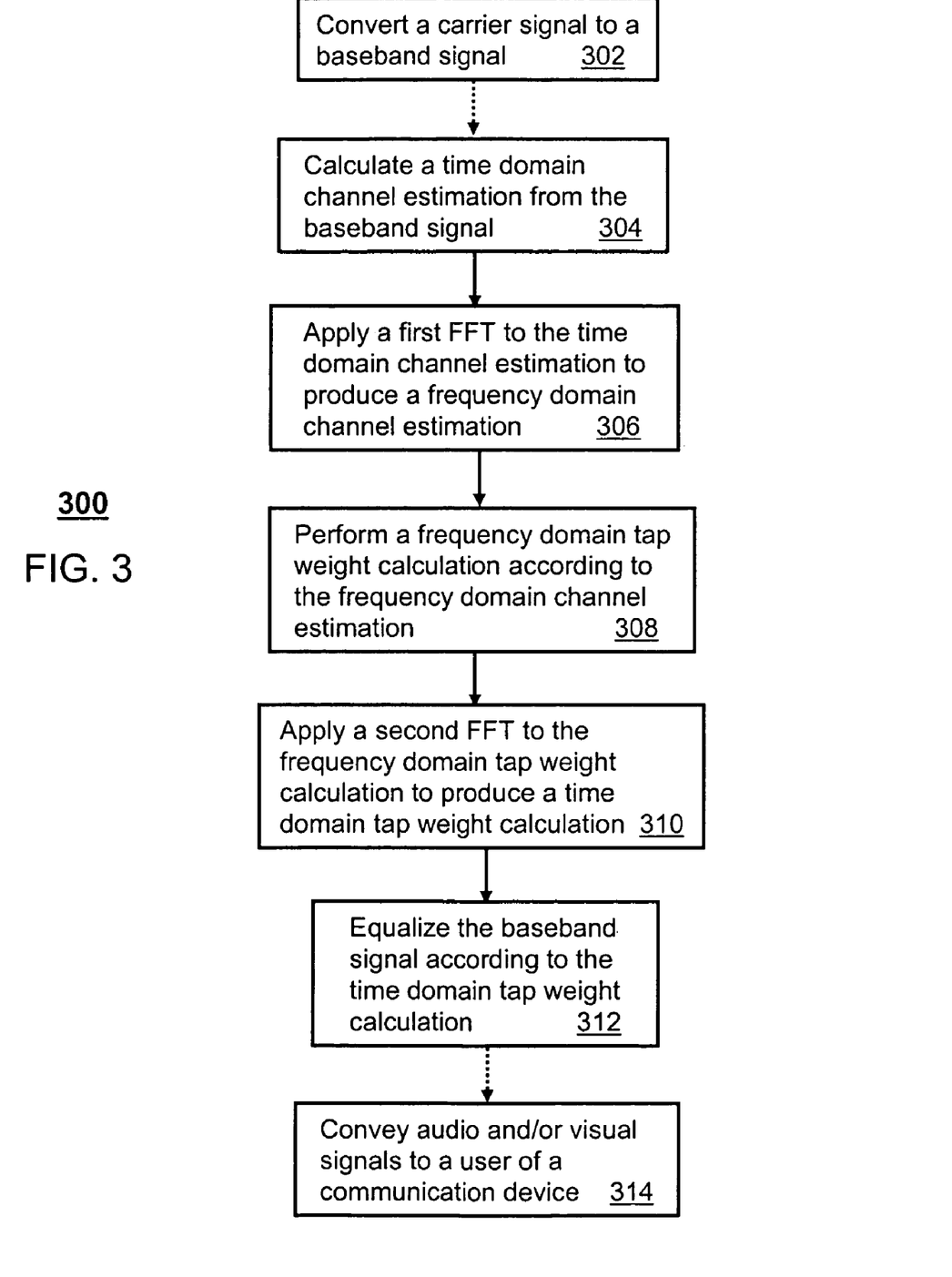
FIG. 3 depicts a flowchart of a method operating in the communication device incorporating teachings of the present disclosure.

Referring back to FIG. 1, the aforementioned equalizer 100 can be integrated into the transceiver 202 or the controller 208 of the communication device 200 in whole or in part as a hardware and/or software component performing the functions described in steps 304-312 of FIG. 3. With this in mind, FIG. 3 depicts a flowchart of a method 300 operating in the communication device 200 incorporating teachings of the present disclosure. Method 300 begins with step 302 where the transceiver 202 down-converts an intercepted wireless (or wireline) carrier signal to a baseband signal 101. The baseband signal 101 can represent a data signal, video signal, audio signal, or combinations thereof. In step 304, the channel estimation calculator 102 calculates a time domain channel estimation from the baseband signal 101. In step 306, the FFT processor 104 translates the time domain channel estimation to a frequency domain channel estimation. The tap weight calculator 106 calculates in step 308 a frequency domain tap weight from the frequency domain channel estimation.

The IFFT processor 108 in step 310 translates the frequency domain tap weight calculation to a time domain tap weight calculation. In step 312, the filter 110 equalizes the baseband signal 101 according to the time domain tap weight calculation using a linear filter, thereby producing a signal 105 that restores signal integrity to the baseband signal 101. The functional blocks 102-110 of equalizer 100 as described by the foregoing steps and FIG. 1 can operate as any one of a group of equalizers comprising a Minimum Mean Squared Error (MMSE) equalizer, a Decision Feedback (DF) equalizer, a Least Mean Square (LMS) equalizer, or a Recursive Least Square (RLS) equalizer. Once any one of these equalizer embodiments has generated an equalized signal 105, the controller 208 can process said signal and thereby convey audio and/or visual signals in step 314 to a user of the communication device 200 from the audio system 206 and/or display 204, respectively.

The aforementioned communication device 200 can be represented by any number of embodiments such as, for example, wireless mobile device (like a cellular phone or wireless PDA), a cable transceiver (such as a set-top box), a modem (such as a cable or DSL modem), a Voice over IP (VoIP) handset, and a POTS (Plain Old Telephone) handset, just to mention a few.

The discussions that follow provide a brief mathematical overview of the equalizer 100 as depicted in FIGS. 1-3. The following discussion assumes the equalizer 100 operating in the communication device 200 processes signals in a WCDMA/HSDPA (Wideband Code Division Multiple Access/High Speed Downlink Packet Access) communication system.

Prior art LMMSE equalizers that perform calculations entirely in the time domain (herein referred to as time-domain LMMSE equalizers) need to invert a rather large matrix in order to calculate optimum filter taps. The size of the matrix that needs to be inverted is E by E, where E is the number of taps in the equalizer. The number of taps is a function of the delay spread of the channel. In the case of a Pedestrian B environment the channel impulse response extends over 16 chips for an HSDPA system, and the optimum number of taps in the equalizer is between 24 and 30. Fewer taps leads to degradation in performance and more taps does not provide any extra performance benefit but increases computational complexity. In a mobile environment where the channel state changes rapidly (particularly, for vehicular speeds) the receiver will be required to calculate optimum equalizer taps very frequently which puts a significant computational overhead on the receiver thus making the time-domain LMMSE equalizer an expensive solution to implement in mobile handsets.

Method 300 proposes a technique for calculating the optimal filter weights without the need for explicit matrix inversion and without compromising the performance in mobile channels. In the time-domain LMMSE equalizer the signal output of the equalizer is given by:

$$y_i = \sum_{j=0}^{E-1} f_j r_{i-j} = \sum_{j=0}^{E-1} \sum_{l=0}^{L-1} f_j h_l p_{i-j-l} + \sum_{j=0}^{E-1} f_j n_{i-j} \quad (1)$$

According to method 300 this equation can be represented in the frequency domain, where convolution is replaced by product. The variables in the frequency domain are therefore given by:

$$Y_i = \sum_{n=0}^{N-1} y_n e^{-j2\pi \frac{ni}{N}} \quad (2)$$

$$X_i = \sum_{n=0}^{N-1} x_n e^{-j2\pi \frac{ni}{N}}$$

$$H_i = \sum_{n=0}^{N-1} h_n e^{-j2\pi \frac{ni}{N}}$$

$$F_i = \sum_{n=0}^{N-1} f_n e^{-j2\pi \frac{ni}{N}}$$

$$B_i = \sum_{n=0}^{N-1} f_n e^{-j2\pi \frac{ni}{N}}$$

Thus in the frequency domain equation (1) can be represented as:

$$Y_i = F_i H_i X_i + F_i N_i$$

$$\tilde{Y}_i = B_i X_i \quad (3)$$

In the frequency domain the mean square error is given by:

$$\psi_i = \langle (Y_i - \tilde{Y}_i)(Y_i^* - \tilde{Y}_i^*) \rangle \quad (4)$$

$$= F_i F_i^* \left( H_i H_i^* + \frac{\sigma^2}{p} \right) - B_i F_i^* H_i^* - B_i^* F_i H_i$$

It should be noted that averaging is not done over the index i (which is the frequency bin) but rather averaging is performed from one frame to the next. Thus the MMSE criteria corresponds to choosing optimal weights of the equalizer taps, $F_i$, such that the MSE (Mean Squared Error) of each frequency bin is minimized. However since the MSE of a frequency bin $\psi_i$ depends only on $F_i$, the only relevant terms of the MMSE criteria are:

$$\frac{\partial \psi_i}{\partial F_i} = F_i^* \left( H_i H_i^* + \frac{\sigma^2}{p} \right) - B_i^* H_i = 0 \quad (5)$$

In order to solve equation (5) properly the equalizer 100 is constrained to have a finite number of taps in the time domain, i.e., $f_i=0$ for $i>E$. This constraint can be added to equation (5) in order to provide a solution that is the equivalent of solving the MMSE criteria in the time domain as outlined in method 300. In order to include the finite spread of the equalizer in the time domain, equation (4) is modified by the following expression:

$$F_i = \sum_{l=0}^{E-1} f_l e^{-2\pi j \frac{il}{N}} = \sum_{l=0}^{E-1} f_l \theta_{li} \quad i = 0, 1, \ldots, N-1 \quad (6)$$

In equation (6) θ is a more compact notation for the exponential terms that are involved with FFT and IFFT operation as discussed in method 300. This notation has been chosen to keep the equations more compact and easy to understand. Using this explicit form of $F_i$, the mean square error for each frequency bin is given by:

$$\psi_i = \sum_{k,l=0}^{E-1} f_k f_l^* (\theta_{ki} \theta_{li}^*) \left( H_i H_i^* + \frac{\sigma^2}{p} \right) - \sum_{k=0}^{E-1} f_k^* \theta_{ki}^* B_i H_i^* - \sum_{k=0}^{E-1} f_k \theta_{ki} B_i^* H_i \quad (7)$$

The MMSE criteria, when applied to each frequency bin leads to the following set of conditions that must be satisfied by the optimum solution:

$$\sum_{l=0}^{E-1} f_l^* \left( \frac{\theta}{ki} \theta_{li}^* \right) \left( H_i H_i^* + \frac{\sigma^2}{p} \right) = \frac{\theta}{ki} B_i^* H_i \quad (8)$$

This set of conditions can be expressed more compactly by using matrix notation as:

$$f^H \Theta^H = D^H \Rightarrow f = \tilde{\Theta}^{-1} D \quad (9)$$

$$D_i = \frac{B_i^* H}{\left( H_i H_i^* + \frac{\sigma^2}{p} \right)}$$

Since both $H_i$ and $B_i$ are scalars this calculation of the MMSE criteria in the frequency domain does not require any matrix inversion but rather simple multiplications and division as shown in equation (9). Since the pseudo inverse of $\theta^H$ is known a-priori it does not have to be calculated explicitly at the receiver.

The equalizer 100 described above is different from prior art equalizers operating entirely in the time domain or frequency domain such as in Orthogonal Frequency Division Modulation (OFDM) systems. According to method 300 the taps of equalizer 100 are calculated in the frequency domain, which when compared to prior art systems avoids conversion of a whole data frame/slot to the frequency domain in a communication system such as WCDMA/HSDPA. Since the equalizer depth is typically much smaller than slot lengths, the required FFT size with method 300 is smaller. That is, in the case of a WCDMA/HSDPA system each slot consists of 2560 samples. If the entire equalization is done in frequency domain (such as in prior art systems) a 2560 point FFT would be required. With method 300 only a 64 point FFT would be needed even in the most dispersive channel such as Pedestrian B.

Figure 4:
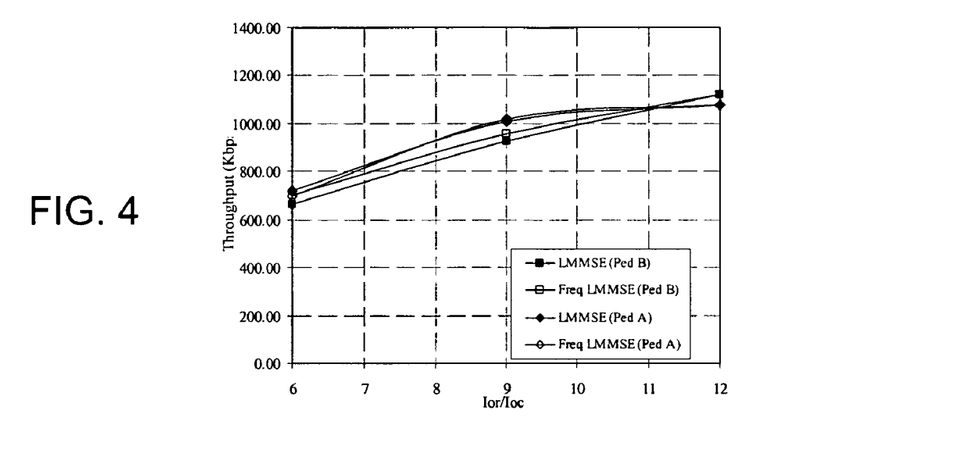
FIGS. 4-6 depict simulations comparing a prior art equalizer with the equalizer of the present disclosure.
Figure 5:
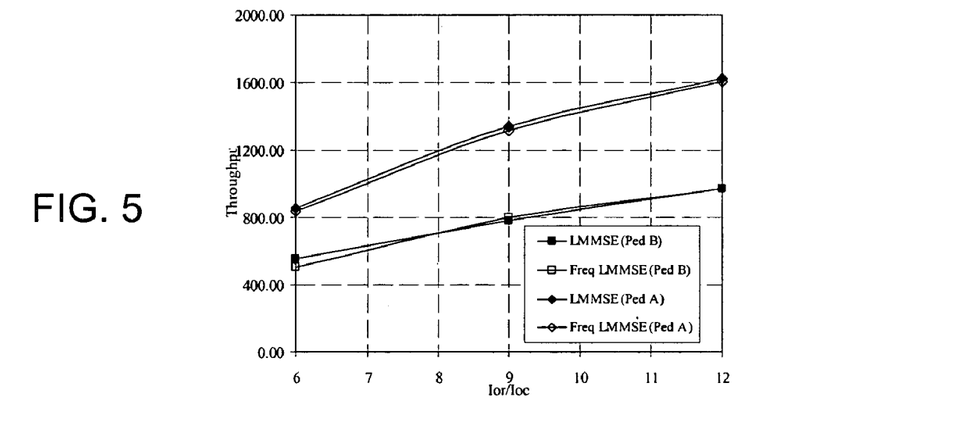
Figure 6:
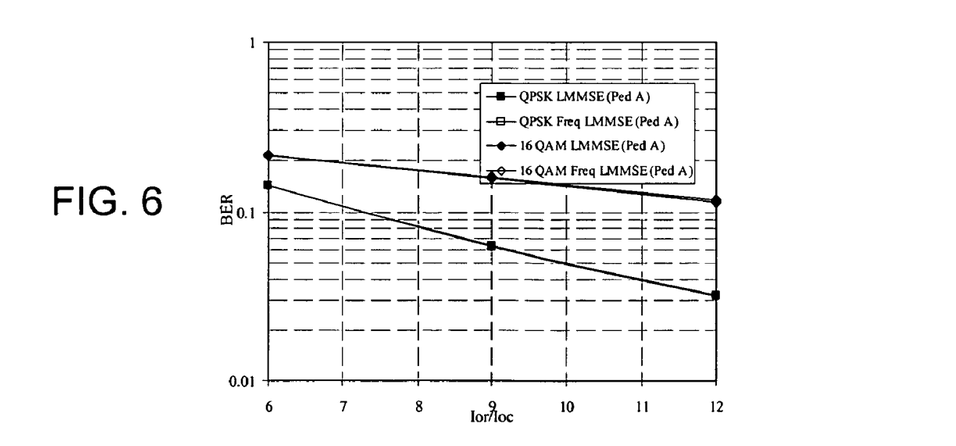

FIGS. 4-6 depict simulations comparing a prior art equalizer with the equalizer of FIGS. 1-3 according to the teachings of the present disclosure. These simulations compare the performance of the time-domain LMMSE equalizer and the equalizer 100 of the present disclosure based on link level simulations of HSDPA. The transmitted signal for these simulations consists of control channels (CPCIH, PCCPCH, SCH, PICH) and an HS-DSCH with 15 code transmission. A total of three communication devices 200 (embodied as cellular phones) were code multiplexed at a given time with each communication device 200 having 5 codes. The data for an additional two communication devices 200 occupying the remainder of the 10 codes channels, acted as the OCNS along with 4 HS-SCCH which were modeled explicitly. The HS-DSCH (all 15 codes) is allocated 80% of the power (~−1 dB $E_c/I_{or}$), and the remainder 20% of the power is shared by the control channels and the HS-SCCH channels.

The composite signal at the transmitter is converted into the analog domain signal by using a transmission filter and 4× up-sampling. The transmission filter used is the same as specified by the 3GPP specifications. The up-sampled signal is taken through a multipath fading channel. Other cell interference $I_{oc}$, modeled as AWGN was added to the signal at the receiver. The variance of $I_{oc}$ was adjusted to model a desired geometry($I_{or}/I_{oc}$).

The received signal is down-sampled by 4× using a match filter and then is used according to a realistic channel/noise variance estimation and tracking algorithms. Channel estimates are used rather than the perfect knowledge to accurately model the performance of an HSDPA receiver in the real world. The channel and noise variance estimates are used to calculate the optimum equalizer taps and to generate the LLR (log-likelihood-ratio) of the soft bits. The LLRs are then used by the Turbo Decoder and H-ARQ stage to estimate the information bits.

Finally for each transport block the received information bits are compared against the transmitted information bits to determine if a H-ARQ retransmission is needed. If there are no errors then the transport block is marked as received without error. However, if error are found and the maximum number of H-ARQ transmissions is not reached, then the block is retransmitted with a 12 millisecond delay and different redundancy version, if the maximum number of H-ARQ is not reached. On the other hand, if the block is received with errors and the maximum number of H-ARQ transmission is reached then the transport is marked as received with error. The maximum number of allowed H-ARQ transmission is set at 4 for the purposes of these simulations.

The average throughput for a given $I_{or}/I_{oc}$ and $E_c/I_{or}$ combination is a function of the transport block size, average number of retransmission required and the BLER (block error rate) at the end of the maximum number of H-ARQ transmission given by:

$$T = \frac{M}{2e-3} \frac{(1-BLER)}{NTRANS} \quad (10)$$

where T is the transport block size, BLER is the block error rate after 4 H-ARQ transmissions and NTRANS is the average number of H-ARQ required per transport block.

FIG. 4 depicts the throughput of a 5 code communication device 200 operating in QPSK Mode with a transport block size of 2362 bits. FIG. 5 depicts the throughput of a 5 code communication device 200 operating in a 16 QAM Mode with a transport size of 4420 bits. FIG. 6 depicts the BER (Bit Error Rate) comparison between a time-domain LMMSE equalizer and equalizer 100 as described in FIGS. 1-3 in Ped A and Ped B environments. Since a time-domain LMMSE equalizer and equalizer 100 are based on the same mathematical principle but expressed in different domains, there is no expected performance difference between them. This is supported by simulation results under various conditions and channel models. In spite of similar performance the two approaches differ vastly in their computational complexity.

Figure 7:
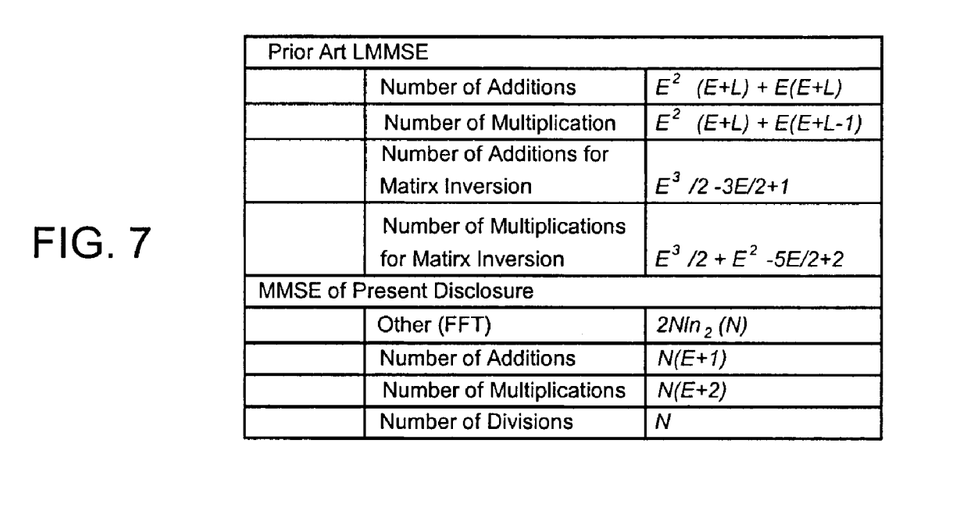
FIGS. 7-8 depict tabulations of computational complexity between a prior art equalizer and the equalizer of the present disclosure.
Figure 8:
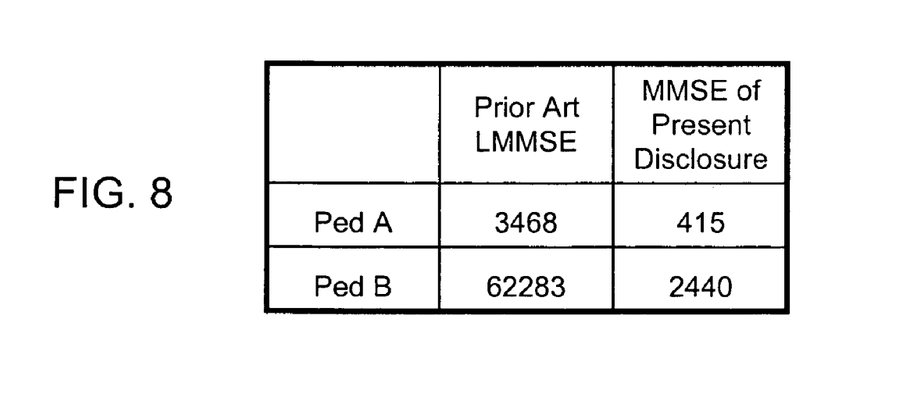

FIG. 7 depicts a table of the number of multiplications, additions and divisions required by each of the time-domain LMMSE equalizer and equalizer 100 as a function of L, E, and N which are the memory of the channel, number of taps in the equalizer, and FFT size. FIG. 8 depicts a table of the number of operations required by the time-domain LMMSE equalizer and equalizer 100 for calculating the optimum tap weights for the Ped A and Ped B environment.

From FIGS. 7-8 it is apparent that equalizer 100 is significantly less complex than the prior art time-domain LMMSE equalizer with comparable performance. The foregoing simulation results show virtually no difference between the performance of the time-domain LMMSE equalizer and equalizer 100. Depending on the environment, the equalizer 100 is able to achieve the same level of performance with $(1/25)^{th}$ the complexity that of the prior art time-domain LMMSE equalizer.

Figure 9:
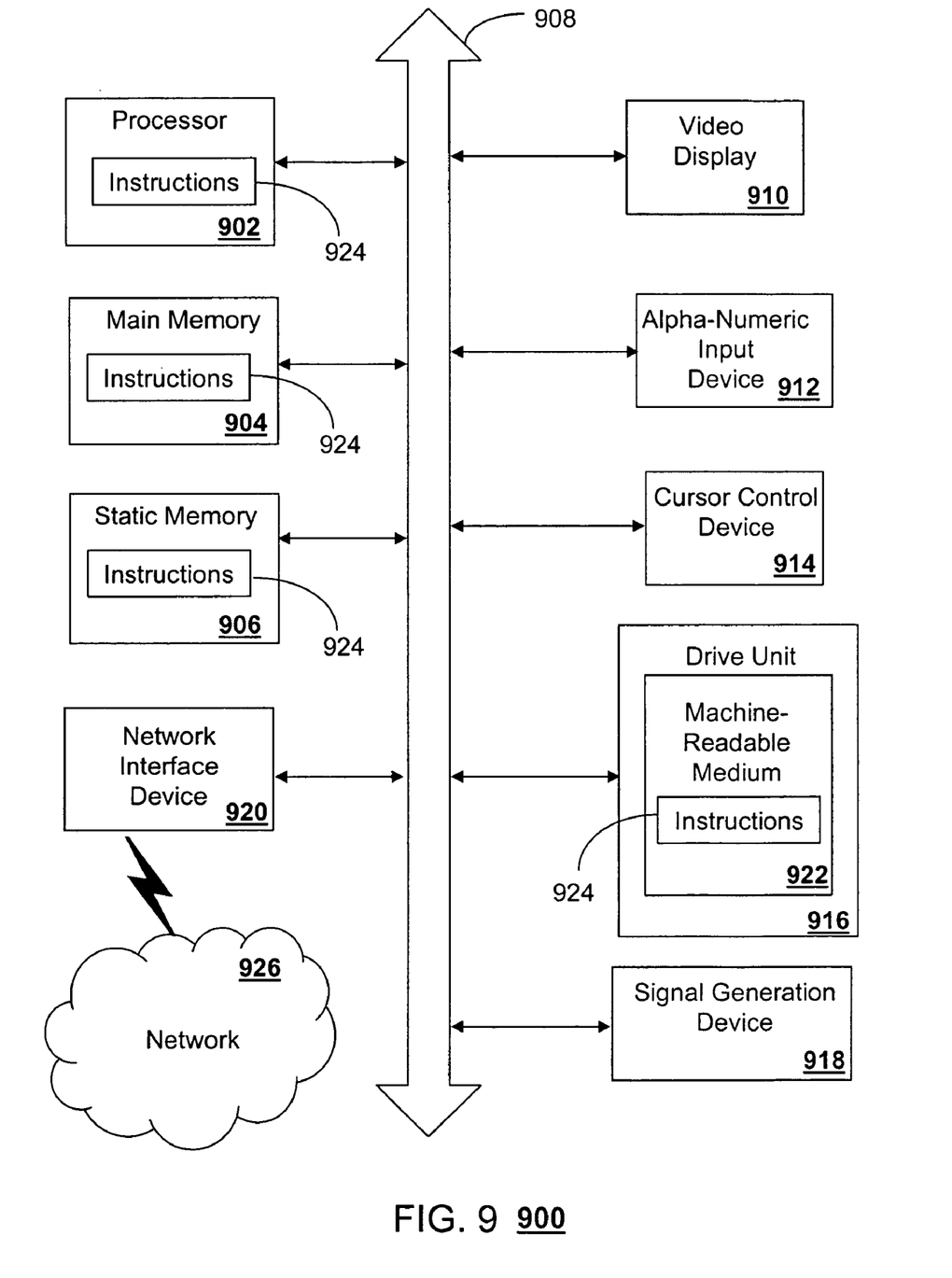
FIG. 9 is a diagrammatic representation of a machine in the form of a computer system within which a set of instructions, when executed, may cause the machine to perform any one or more of the methodologies discussed herein.

FIG. 9 is a diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated in herein above. The instructions 924 may also reside, completely or at least partially, within the main memory 904, the static memory 906, and/or within the processor 902 during execution thereof by the computer system 900. The main memory 904 and the processor 902 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communications device, comprising:
  a transceiver operating in a wideband code division multiple access/high speed downlink packet access communication system;
  a memory storing computer instructions; and
  a controller coupled to the memory and the transceiver, wherein the controller, responsive to executing the computer instructions, performs operations comprising:
    converting a carrier signal to a baseband signal;
    calculating a time domain channel estimation from the baseband signal;

applying a Fast Fourier Transform to the time domain channel estimation to produce a frequency domain channel estimation;

performing a frequency domain tap weight calculation according to the frequency domain channel estimation without performing a matrix inversion to perform the frequency domain tap weight calculation;

applying an inverse Fast Fourier Transform to the frequency domain tap weight calculation to produce a time domain tap weight calculation;

equalizing the baseband signal according to the time domain tap weight calculation using a linear filter to provide an equalized signal;

processing the equalized signal to convey audio signals from an audio system of the communications device and to convey visual signals from a display of the communications device; and performing an equalizer function according to one group among a group of equalizer techniques comprising a least mean square equalization, and a recursive least square equalization.

2. The communications device of claim 1, wherein the controller, responsive to executing the computer instructions, performs operations comprising performing the equalizer function where averaging is performed from one frame to a next frame.

3. The communications device of claim 1, wherein the baseband signal is at least one among a group of communication signals comprising a data signal, a video signal, an audio signal, and a combined video or audio signal.

4. The communications device of claim 1, comprising an audio system, wherein the controller responsive to executing the computer instructions, performs operations comprising conveying audible signals according to the equalized baseband signal.

5. The communications device of claim 1, comprising a display, wherein the controller responsive to executing the computer instructions, performs operations comprising conveying visual signals according to the equalized baseband signal.

6. The communications device of claim 1, wherein the communications device is at least one among a group of devices comprising a wireless mobile device, a cable transceiver, a modem, a voice over internet protocol handset, or a Plain Old Telephone handset.

7. A non-transitory computer-readable storage medium, comprising computer instructions which, responsive to being executed by at least one processor, cause the at least one processor to perform operations comprising:

calculating a time domain channel estimation from an incoming signal transmitted in a wideband code division multiple access/high speed downlink packet access communication system;

translating the time domain channel estimation to a frequency domain channel estimation;

performing a frequency domain tap weight calculation according to the frequency domain channel estimation without performing a matrix inversion to perform the frequency domain tap weight calculation;

translating the frequency domain tap weight calculation to a time domain tap weight calculation;

equalizing the incoming signal according to the time domain tap weight calculation using a linear filter to provide an equalized signal;

processing the equalized signal to convey audio signals from an audio system of a communications device and to convey visual signals from a display of the communications device; and performing an equalizer function on the incoming signal according to one group among a group of equalizer techniques comprising a minimum mean squared error equalization, a least mean square equalization, and a recursive least square equalization.

8. The non-transitory computer-readable storage medium of claim 7, comprising computer instructions which when executed by the at least one processor cause the at least one processor to perform operations comprising applying a Fast Fourier Transform to the time domain channel estimation to produce the frequency domain channel estimation by using no more than a 64 point Fast Fourier Transform for the Fast Fourier Transform.

9. The non-transitory computer-readable storage medium of claim 7, comprising computer instructions which when executed by the at least one processor cause the at least one processor to perform operations comprising applying an inverse Fast Fourier Transform to the frequency domain tap weight calculation to produce the time domain tap weight calculation.

10. The non-transitory computer-readable storage medium of claim 7, comprising computer instructions which when executed by the at least one processor cause the at least one processor to perform operations comprising performing the equalizer function where averaging is performed from one frame to a next frame.

11. The non-transitory computer-readable storage medium of claim 7, wherein the incoming signal is at least one among a group of baseband signals comprising a data signal, a video signal, an audio signal, and a combined video or audio signal.

12. The non-transitory computer-readable storage medium of claim 7, comprising computer instructions which when executed by the at least one processor cause the at least one processor to perform operations comprising conveying audible signals according to the equalized baseband signal.

13. The non-transitory computer-readable storage medium of claim 7, comprising computer instructions which When executed by the at least one processor cause the at least one processor to perform operations comprising conveying visual signals according to the equalized baseband signal.

14. An equalizer, comprising:

a channel estimation calculator for calculating a time domain channel estimation from a baseband signal transmitted in a wideband code division multiple access/high speed downlink packet access communication system;

an Fast Fourier Transform processor for translating the time domain channel estimation to a frequency domain channel estimation;

a tap weight calculator for calculating a frequency domain tap weight according to the frequency domain channel estimation without performing a matrix inversion to calculate the frequency domain tap weight;

an inverse Fast Fourier Transform processor for translating the frequency domain tap weight calculation to a time domain tap weight calculation;

a linear filter for equalizing the baseband signal according to the time domain tap weight calculation to provide an equalized signal, wherein the equalized signal is processed to convey audio signals from an audio system of a communications device and to convey visual signals from a display of the communications device; and wherein equalization is performed according to one group among a group of equalizers comprising a minimum mean squared error equalizer, a least mean square equalizer, and a recursive least square equalizer.

15. The equalizer of claim 14, wherein the equalizer function is performed where averaging is performed from one frame to a next frame.

16. The equalizer of claim 14, wherein the baseband signal is at least one among a group of communication signals comprising a data signal, a video signal, an audio signal, and a combined video or audio signal.

17. The equalizer of claim 14, comprising an audio system for conveying audible signals according to the equalized baseband signal.

18. The equalizer of claim 14, comprising a display for conveying visual signals according to the equalized baseband signal.

19. The equalizer of claim 14, wherein the equalizer is incorporated into at least one among a group of communication devices comprising a wireless mobile device, a cable transceiver, a modem, a voice over internet protocol handset, or a Plain Old Telephone handset.

* * * * *